United States Patent [19]
Godwin et al.

[11] Patent Number: 5,851,020
[45] Date of Patent: Dec. 22, 1998

[54] GANG HITCH FOR MOWER

[75] Inventors: Lawrence A. Godwin, 8119 Frontage Rd., Fairland, Ind. 46126; Richard D. Conard, Indianapolis, Ind.

[73] Assignee: Lawrence A. Godwin, Fairland, Ind.

[21] Appl. No.: 422,714

[22] Filed: Apr. 14, 1995

[51] Int. Cl.⁶ .................................................. B60D 1/50
[52] U.S. Cl. ................ 280/413; 56/15.7; 56/DIG. 14; 280/483; 280/488
[58] Field of Search ...................... 280/411.1, 409, 280/413, 472, 473, 476.1, 488, 405.1, 483, 484, 485; 172/311, 313, 314, 605, 616; 56/6, 7, 15.7, 15.8, DIG. 14

[56] References Cited

U.S. PATENT DOCUMENTS

| | | | |
|---|---|---|---|
| 2,287,234 | 6/1942 | Ducharme | 280/483 |
| 2,441,430 | 5/1948 | McCullar . | |
| 2,498,779 | 2/1950 | Winchester | 280/405.1 |
| 2,699,957 | 1/1955 | White | 280/485 |
| 2,816,778 | 12/1957 | Gaines | 280/483 |
| 2,890,561 | 6/1959 | Bonner et al. | 56/7 |
| 3,058,280 | 10/1962 | Lewis | 56/6 |
| 3,224,176 | 12/1965 | Taylor | 56/7 |
| 3,514,126 | 5/1970 | Fuss | 56/6 |
| 3,612,573 | 10/1971 | Hoffman | 56/7 |
| 3,738,682 | 6/1973 | Ritter | 280/413 |
| 3,832,834 | 9/1974 | Kovacs | 56/6 |
| 4,063,748 | 12/1977 | Schmidt | 56/6 |
| 4,113,273 | 9/1978 | Gates | 280/413 |
| 4,287,706 | 9/1981 | Tobin, Jr. | 56/7 |
| 4,306,402 | 12/1981 | Whimp | 56/7 |
| 4,481,755 | 11/1984 | Carr | 56/7 |
| 4,637,625 | 1/1987 | Blackwell | 280/492 |
| 4,697,404 | 10/1987 | Brockmeier et al. | 56/6 |
| 4,744,580 | 5/1988 | Ryan | 56/6 |
| 4,815,259 | 3/1989 | Scott | 56/6 |
| 4,870,810 | 10/1989 | Gordy | 56/6 |
| 5,423,565 | 6/1995 | Smith | 280/411.1 |

FOREIGN PATENT DOCUMENTS

| 0043544 | 6/1934 | France | 280/488 |
|---|---|---|---|

*Primary Examiner*—Anne Marie Boehler
*Attorney, Agent, or Firm*—Barnes & Thornburg

[57] ABSTRACT

A hitch assembly for towing a mower includes a tool bar, a first hitch member for mounting on the tool bar, a pivot pin extending from the mower for engagement by the hitch member, and a spring for exerting a lifting force between the pin and the hitch member to transfer a portion of the weight of the mower to the hitch assembly. The spring may be a tension spring extending between the pivot pin and an upper hitch portion to bias the pivot pin toward the upper hitch portion, or a compression spring captured between the hitch member and a spring seat to bias the pivot pin upward relative to the hitch member.

14 Claims, 3 Drawing Sheets

GANG HITCH FOR MOWER

BACKGROUND OF THE INVENTION

This invention relates to a gang hitch that permits multiple, conventional rotary power mowers to be pulled behind a tractor. More particularly, the present invention relates to a gang hitch having mechanisms for connecting the individual mowers to the gang hitch to transfer weight from the individual mowers' front wheels to the gang hitch.

Conventional rotary power mowers are perhaps the most commonly used, and most commonly available, devices for mowing. The time required to mow a lawn is dictated by the speed at which the lawnmower is propelled and the width of the mower's cut. Less time is required if the lawnmower is propelled faster or if a mower having a wider cutting width is employed. A practical limit of cutting width is quickly reached in operator-propelled rotary mowers. That limit is generally in the 20–22 inch (about 50–56 cm) range. Gang hitches permit multiple mowers to be hitched to and pulled by, for example, a tractor-type lawn mower, so that a broader cutting swath can be achieved. The combined broader swath of the lawn tractor and multiple mowers reduces mowing time.

Gang hitches for lawnmowers are well known. There are, for example the gang hitches of U.S. Patents: U.S. Pat. Nos. 4,287,706; 4,481,755; 4,306,402; 4,113,273; 3,224,176; 3,058,280; and, 2,890,561. There are also the gang hitches of U.S. Patents: U.S. Pat. Nos. 3,612,573; 4,870,810; 4,815,259; 4,744,580; 4,687,404; 4,637,625; 4,063,748; 3,832,834; and 3,514,126.

It would be advantageous to provide a gang hitch having a mechanism to connect each individual mower to the gang hitch. In addition to hitching the individual mower to the gang hitch, such mechanisms would transfer weight from the individual mowers to the gang hitch. Transferring weight from the individual mower to the gang hitch would reduce the mower weight borne, for example, by each mower's front wheels and transfer this weight to, for example, the tractor's hitch, making the gang hitch and multiple mower assembly more maneuverable.

SUMMARY OF THE INVENTION

According to the invention, a hitch assembly for towing a mower includes a tool bar, a first hitch member for mounting on the tool bar, a pivot pin extending from the mower for engagement by the hitch member, and a spring for exerting a lifting force between the pin and the hitch member to transfer a portion of the weight of the mower to the hitch assembly.

Illustratively, according to the invention, the hitch member comprises an upper hitch portion and a lower hitch portion. The pivot pin engages the lower hitch portion. The spring comprises a tension spring extending between the pivot pin and the upper hitch portion to bias the pivot pin toward the upper hitch portion.

Further illustratively, the spring comprises a compression spring. A spring seat is formed on the pivot pin. The compression spring is captured between the hitch member and the spring seat to bias the pivot pin upward relative to the hitch member.

Additionally illustratively, the hitch assembly further comprises a tongue for attachment to the tool bar and to a towing vehicle.

Further illustratively, a caster is provided on the tool bar for receiving at least a portion of the transferred weight.

A BRIEF DESCRIPTION OF THE DRAWINGS

The invention may best be understood by referring to the following description and accompanying drawings which illustrate the invention. In the drawings.

DETAILED DESCRIPTION OF THE DRAWINGS

Figure 1:
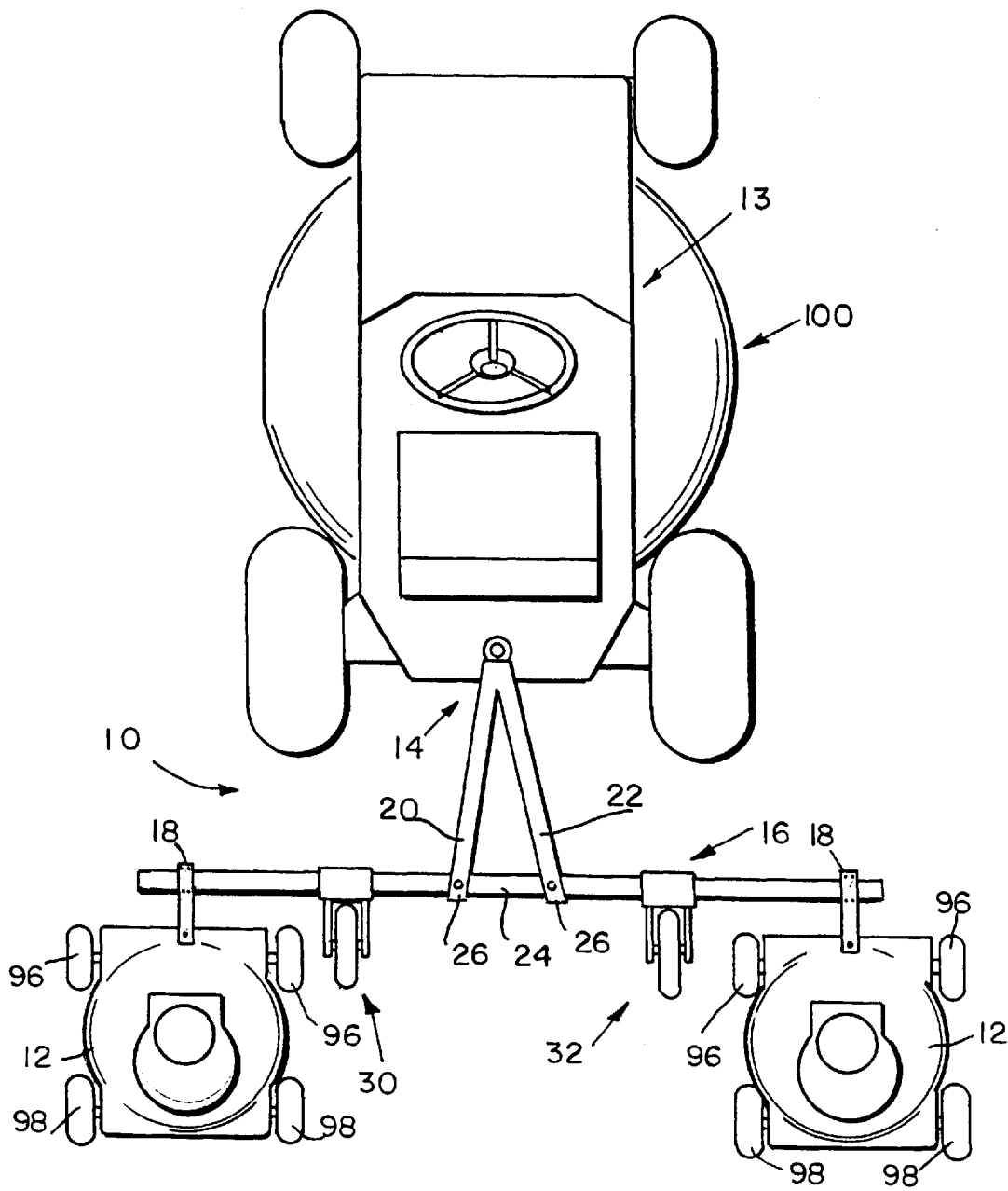
FIG. 1 illustrates a top plan view of a gang hitch according to the invention.

A gang hitch 10 illustrated in FIG. 1 permits multiple mowers 12 to be pulled by a single tractor 13. The gang hitch 10 includes a tractor hitch 14 to connect gang hitch 10 to tractor 13, a frame 16, and mower weight-bearing hitches 18. The hitches 18 hitch mowers 12 to frame 16 and transfer portions of the weight of mowers 12 to frame 16 to make gang hitch 10 and mowers 12 more maneuverable. The frame 16 includes first and second tongue members 20, 22 for connecting frame 16 to tractor hitch 14 and a tool bar 24 connected to the tongue members 20, 22 illustratively by bolts 26 and nuts (not shown). The first and second tongue members 20, 22 diverge from hitch 14 toward tool bar 24. Optional casters 30, 32 are provided adjacent the junctions of tongue members 20, 22 with tool bar 24 to bear weight transferred from mowers 12 in a manner which will be described. These casters 30, 32 may be required if the hitch 14 is flexible, but are optional if the hitch 14 is rigid.

Figure 2:
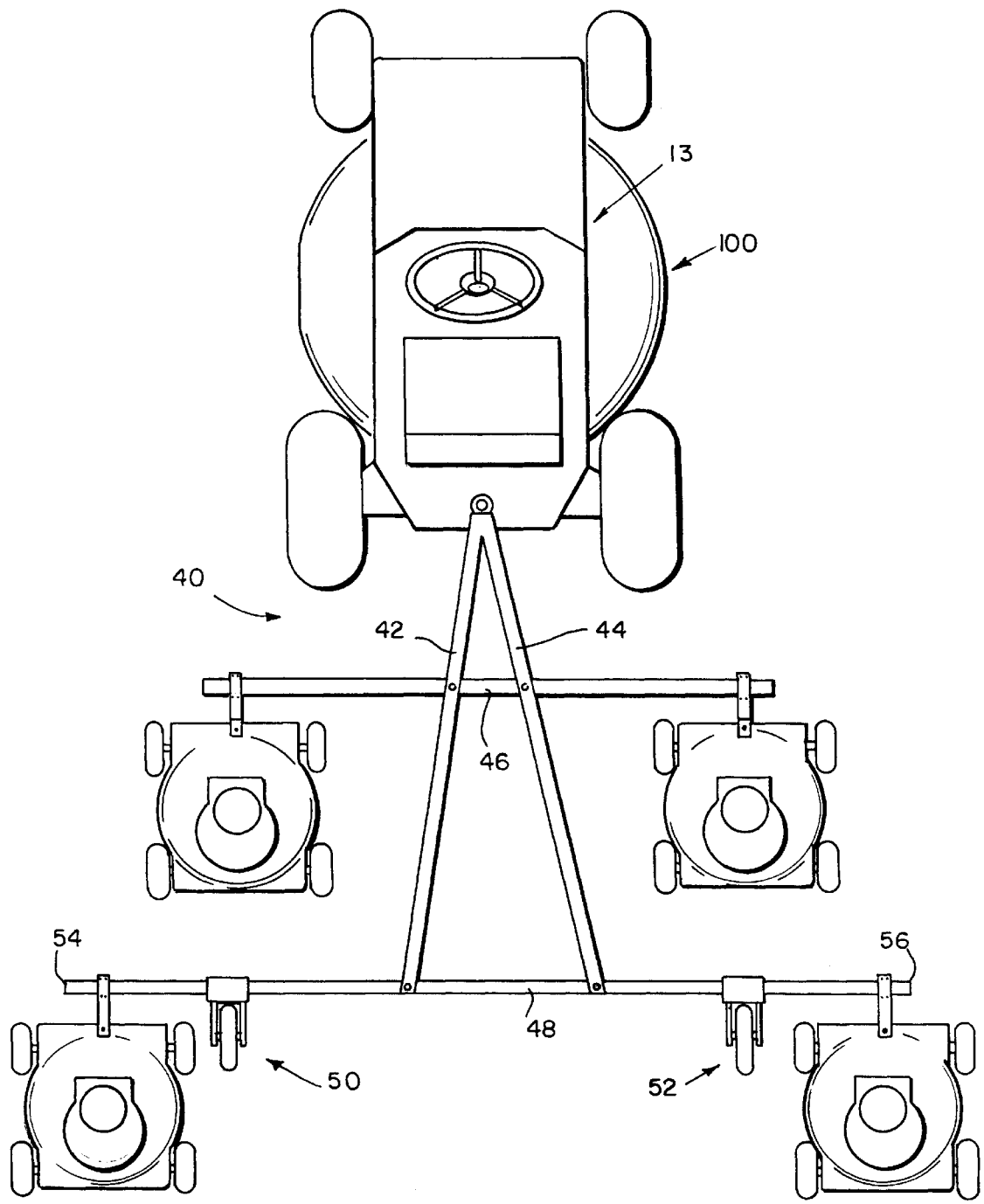
FIG. 2 illustrates a top plan view of another gang hitch according to the invention.

Another embodiment of the invention is illustrated in FIG. 2. This embodiment includes a gang hitch 40 having first and second tongue members 42, 44 and first and second tool bars 46, 48. The tongue members 42, 44 in this embodiment extend past tool bar 46 and terminate at tool bar 48. Casters 50, 52 are provided intermediate the junctions of tongue members 42, 44 and respective ends 54, 56 of tool bar 48.

Figure 3:
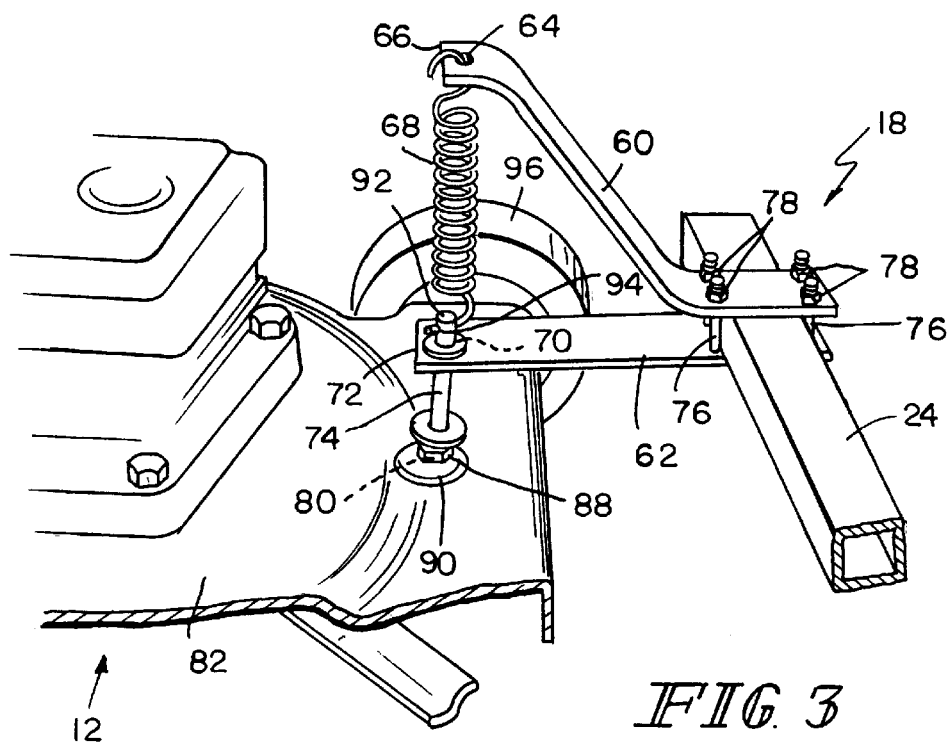
FIG. 3 illustrates a fragmentary perspective view of a detail of the gang hitches of FIGS. 1–2; and, FIG. 4 illustrates a fragmentary perspective view of an alternative detail to the detail illustrated in FIG. 3.

A single hitch 18 is illustrated in more detail in FIG. 3. Each individual hitch 18 includes an upper bracket 60 and a lower bracket 62. Upper bracket 60 is somewhat S shaped in configuration and lower bracket 62 is basically flat. Both are illustratively formed from steel strip of appropriate length. A hole 64 is formed adjacent the remote end 66 of upper bracket 60 to serve as an attachment point for a tension spring 68. A hole 70 is formed adjacent the remote end 72 of bracket 62 to receive a long bolt 74. Brackets 60, 62 are joined together by bolts 76 and nuts 78 at appropriate locations along the length of tool bar 24, 46 or 48 to capture the tool bar 24, 46 or 48 between them. A hole 80 is formed in the deck 82 of each mower 12 which is to be attached to the gang hitch 10 or 40. Bolt 74 is inserted through the hole 80 from the underside of the deck 82 and a nut 88 is threaded onto bolt 74, illustratively with a washer 90 between the nut 88 and the deck 82. The upper, free, end 92 of the bolt 74 is inserted through the hole 70 in lower bracket 62. A transverse hole 94 of sufficient size to receive an end of spring 68 is provided adjacent end 92. Placement of the ends of spring 68 through holes 64 and 94 reduces the load on the front wheels 96 of each mower 12 by the spring constant of spring 68 multiplied by the spring 68's deflection. Spring 68 also provides a positive stop against downward movement of bolt 74 when spring 68 bottoms out on the top surface of bracket 62. The weight transferred from the front wheels 96 of mowers 12 is ultimately transferred to and borne by the rear wheels 98 of mowers 12, tractor hitch 14 and casters 30, 32, 50, 52.

Figure 4:
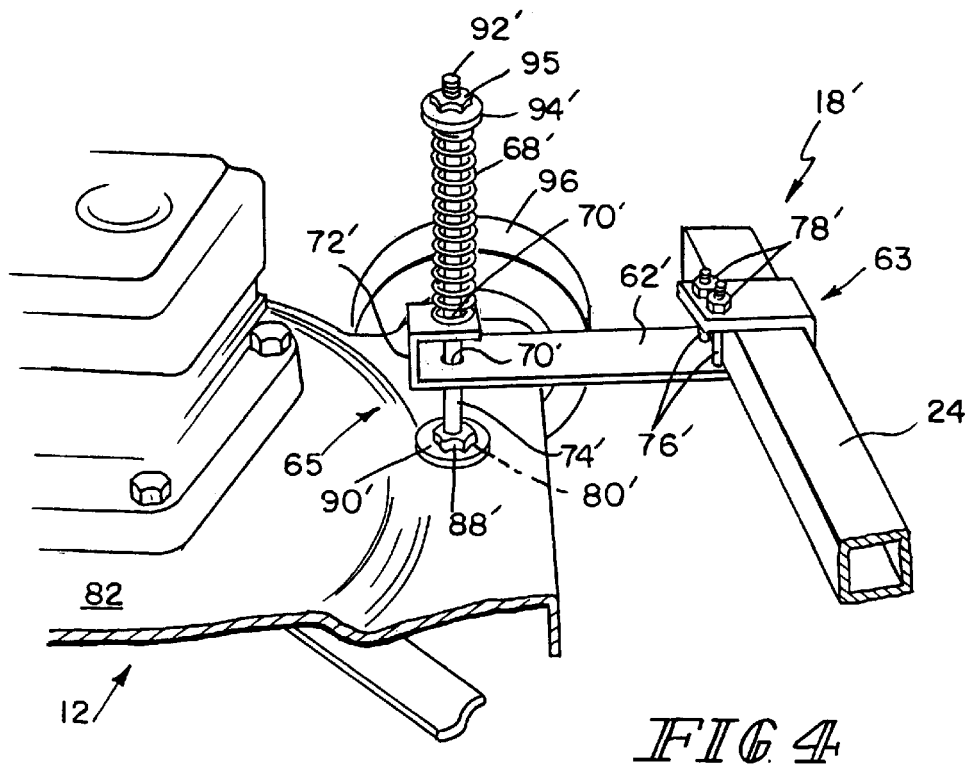

Another hitch configuration 18' is illustrated in more detail in FIG. 4. Each individual hitch 18' includes a single bracket 62'. Bracket 62' has two somewhat C shaped ends 63, 65 opening toward each other. Bracket 62' is illustratively formed from steel strip of appropriate length. Vertically aligned holes 70' are formed adjacent the remote end 72' of bracket 62' to receive a long bolt 74'. End 63 of bracket 62' is clamped around tool bar 24, 46 or 48 by bolts 76' and nuts 78' at appropriate locations along the length of tool bar 24, 46 or 48 to capture the tool bar 24, 46 or 48 between them. A hole 80 is formed in the deck 82 of each mower 12 which is to be attached to the gang hitch 10 or 40. Bolt 74' is inserted through the hole 80 from the underside of the deck 82 and a nut 88' is threaded onto bolt 74', illustratively with a washer 90' between the nut 88' and the deck 82. The upper, free, end 92' of the bolt 74' is inserted through the hole 70' in bracket 62'. A compression spring 68' is placed over the upper free end 92' of bolt 74' and is compressed against end 65 of bracket 62' by a washer 94' and nut 95 threaded onto end 92' of bolt 74'. Compression of the spring 68' between end 65 of bracket 62' and the washer 94' on the upper end 92' of bolt 74' reduces the load on the front wheels 96 of each mower 12 by the spring constant of spring 68' multiplied by the spring 68'3 s deflection. Spring 68' also provides a positive stop against downward movement of bolt 74' when spring 68' is fully compressed. The weight transferred from the front wheels 96 of mowers 12 is ultimately transferred to and borne by the rear wheels 98 of mowers 12, tractor hitch 14 and casters 30, 32, 50, 52.

In the illustrated embodiments of the invention, mowers 12 are rotary type mowers and include non-steerable front wheels 96 and rear wheels 98, all on separate axles. Transferring weight from mowers 12 to rear wheels 98, tractor hitch 14 and casters 30, 32, 50, 52 permits front wheels 96 of mowers 12 to ride lightly on the surface over which the mowers 12 are being towed. By reducing the load on front wheels 96 of mowers 12, gang hitch 10, 40 and mowers 12 are rendered more maneuverable since the sliding resistance of front wheels 96 with respect to the surface over which they are mowing is reduced.

In the illustrated embodiments of the present invention, several of the components are assembled with nuts and bolts for compact shipping, storage and assembly. However, the components may be assembled in any suitable manner, for example, by welding.

In the illustrated embodiments of the present invention, the hitches 18 are attached to respective mowers 12 at only one point. In other embodiments of the present invention, multiple attachment points and/or multiple springs can be used for each mower 12.

The mowers 12 are situated on gang hitch 10, 40 so that the effective, combined cutting width of all the lawnmowers 12, 13 is maximized and a continuous swath of the lawn is mowed. In the illustrated embodiments, tractor 13 includes a tractor mounted mower 100. The mowers 12 connected to gang hitch 10, 40 are situated so that mowers 12 do not mow the same swath as tractor mounted mower 100. If tractor 13 did not include a tractor mounted mower 100, the mowers 12 would be situated differently so that the mowers 12 would combine to cut a continuous swath.

The hitches 18, 18' of the present invention improve the maneuverability of gang hitch 10, 40 and mowers 12 by transferring a portion of the weight of mowers 12 to gang hitch 10, 40. The transfer of weight from mowers 12 to gang hitch 10, 40 permits front wheels 96 of each mower 12 to ride light on the surface across which the mowers 12 are towed. Therefore, gang hitch 10, 40 is not simply towing mowers 12 across a lawn or field but it is also bearing a portion of the weight of mowers 12.

Although this invention has been described in detail with reference to certain embodiments, variations and modifications exist within the scope and spirit of the invention as described and as defined in the following claims.

We claim:

1. An assembly comprising a mower and a hitch assembly, the hitch assembly including a tool bar, a first hitch member for mounting on the tool bar, a pivot pin for attachment to the mower so as to extended from the mower for engagement by the hitch member, and a spring for exerting a lifting force between the pin and the hitch member to transfer a portion of the weight of the mower to the hitch assembly.

2. The assembly of claim 1, further comprising a tongue for attachment to the tool bar and to a towing vehicle.

3. The assembly of claim 1, further comprising a caster provided on the tool bar for receiving at least a portion of the transferred weight.

4. A hitch assembly for towing a mower, the hitch assembly including a tool bar, a first hitch member for mounting on the tool bar, the hitch member comprising an upper hitch portion and a lower hitch portion, a pivot pin for attachment to a mower to be towed so as to extend from such a mower for engagement by the hitch member, the pivot pin engaging the lower hitch portion, and a spring for exerting a lifting force between the pin and the hitch member to transfer a portion of the weight of such a mower to the hitch assembly, the spring comprising a tension spring extending between the pivot pin and the upper hitch portion to bias the pivot pin toward the upper hitch portion.

5. The hitch assembly of claim 4, further comprising a tongue for attachment to the tool bar and to a towing vehicle.

6. The hitch assembly of claim 4, further comprising a caster provided on the tool bar for receiving at least a portion of the transferred weight.

7. An assembly comprising a mower and a hitch assembly the hitch assembly including a tool bar, a first hitch member for mounting on the tool bar, a pivot pin for attachment to the mower so as to extend from the mower for engagement by the hitch member, and a spring for exerting a lifting force between the pin and the hitch member to transfer a portion of the weight of the mower to the hitch assembly, the spring comprising a compression spring, the pivot pin providing a spring seat, the compression spring captured between the hitch member and the spring seat to bias the pivot pin upward relative to the hitch member.

8. The assembly of claim 7, further comprising a tongue for attachment to the tool bar and to a towing vehicle.

9. The assembly of claim 7, further comprising a caster provided on the tool bar for receiving at least a portion of the transferred weight.

10. A towing assembly for towing a plurality of mowers, the towing assembly comprising at least one tongue member for connecting to a tractor hitch, a plurality of tool bars coupled to the at least one tongue member, and a plurality of hitch assemblies for attachment to the tool bars, at least one hitch assembly including a pivot pin for attachment to the mower, a hitch member for mounting on the tool bar, and a spring for exerting a lifting force on the hitch member to transfer a portion of the weight of a respective one of the mowers to the hitch assembly.

11. The towing assembly of claim 10, wherein the hitch member includes an upper hitch member portion and a lower hitch member portion, the pivot pin engaging the lower hitch member portion, the spring comprising a tension spring extending between the pivot pin and the upper hitch member portion to bias the pivot pin toward the upper hitch portion.

12. The towing assembly of claim 10, wherein the spring comprises a compression spring, the pivot pin providing a spring seat, the compression spring captured between the hitch member and the spring seat to bias the pivot pin upward relative to the hitch member.

13. The towing assembly of claim 10, further comprising at least one caster on the at least one tool bar for receiving at least a portion of the transferred weight.

14. A hitch assembly for towing a mower having at least one front wheel and at least one rear wheel, the hitch assembly including a tool bar, a first hitch member for mounting on the tool bar, the hitch member comprising an upper hitch portion and a lower hitch portion, a pivot pin for attachment to a mower to be towed so as to extend from such a mower for engagement by the hitch member, the pivot pin engaging the lower hitch portion, and a spring for exerting a lifting force between the pin and the hitch member to transfer a portion of the weight of such a mower to the hitch assembly, the spring comprising a tension spring extending between the pivot pin and the upper hitch portion to bias the pivot pin toward the upper hitch portion.

* * * * *